Jan. 2, 1940. A. J. MACIEJKO 2,185,412
ATTACHMENT FOR CORN HARVESTERS
Filed Jan. 5, 1939
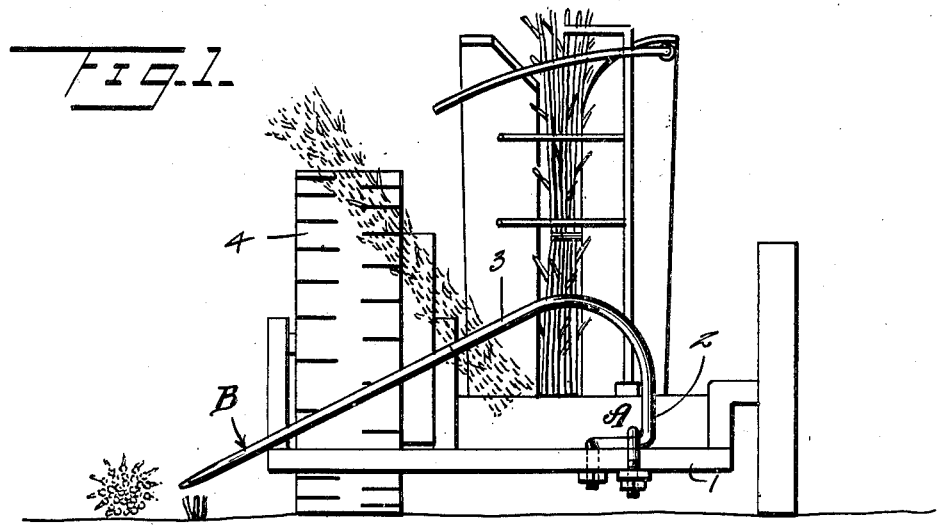
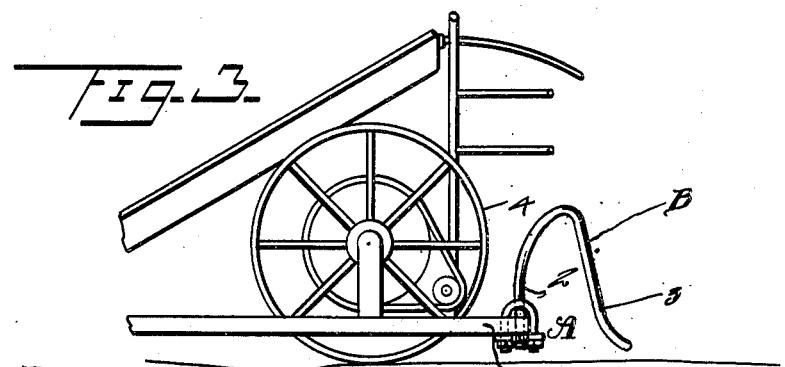
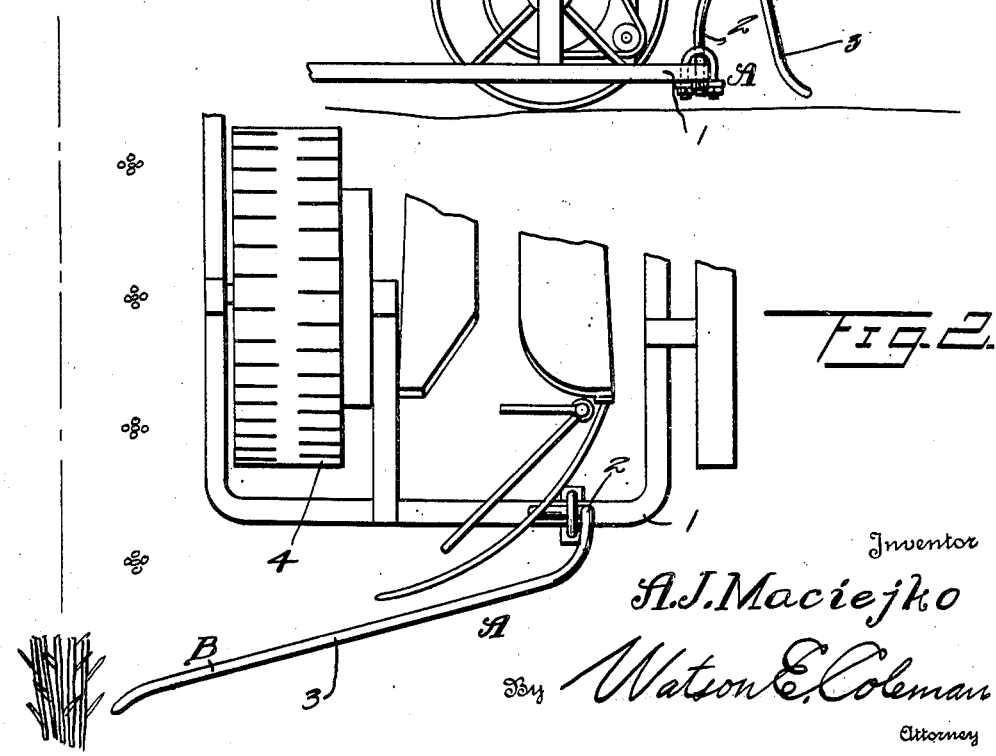
Inventor
A. J. Maciejko
By Watson E. Coleman
Attorney Patented Jan. 2, 1940

2,185,412

UNITED STATES PATENT OFFICE 2,185,412

ATTACHMENT FOR CORN HARVESTERS

Alexander J. Maciejko, Turin, N. Y.

Application January 5, 1939, Serial No. 249,489

1 Claim. (Cl. 56—68)

This invention relates to an attachment for corn harvesters, and it is an object of the invention to provide an attachment which is engaged by the butt end portion of a bundle just after being kicked out or discharged from the harvester to guide such butt end portion in a direction to assure the bundle being delivered upon the ground in a position out of the way of the tractor or draft horses when harvesting the next or succeeding row of corn.

The invention consists in the details of construction and in the combination and arrangement of the several parts of my improved attachment for a corn harvester whereby certain important advantages are attained and the device rendered simpler, less expensive and otherwise more convenient and advantageous for use, as will be hereinafter more fully set forth.

The novel features of my invention will hereinafter be definitely claimed.

In order that my invention may be the better understood, I will now proceed to describe the same with reference to the accompanying drawing, wherein—

Figure 1 is a view in rear elevation illustrating an attachment for a corn harvester constructed in accordance with an embodiment of my invention and in applied position, the harvester proper being diagrammatically illustrated;

Figure 2 is a fragmentary view in top plan of the rear portion of the harvester with my improved attachment as herein disclosed applied thereto;

Figure 3 is a fragmentary view in side elevation of my improved attachment.

As disclosed in the accompanying drawing, 1 denotes a rear cross member in the frame structure of a corn harvester and rearwardly of the discharge mechanism for the gathered bundle. The improved attachment A, as herein disclosed, comprises a metallic bar B of requisite gauge and possessing a certain degree of inherent resiliency. This bar B is formed to provide at one end an upright or post 2 rigidly secured to the member 1 to one side of the center of the member 1 and at the same side as the grainward gathering board. The upper end portion of the upright or post 2 is continued by the elongated member or arm 3 disposed transversely of the harvester and on a downward and outward incline toward the stubbleward side of the harvester and terminating at its lower free end a desired distance outwardly and beyond the bull wheel 4 of the harvester at the stubbleside thereof and in close proximity to the ground.

The upright or post 2 is of such a height to position the elongated member 3 at its upper portion in such position that when a bundle is kicked out or discharged from the hopper the butt end portion of the bundle will contact with said upper portion of the member 3. The top end portion of the bundle, as is believed to be clearly understood, will contact with the ground and as the harvester advances the butt end portion of the bundle will gradually slide by gravity down along the member 3 whereby the bundle will be laid upon the ground in a position substantially parallel with the corn row and sufficiently to one side of the row being cut by the harvester to assure said bundle lying upon the ground out of the way when the next or succeeding row is harvested. By having the bundle delivered upon the ground as just mentioned the draft horses or tractor will readily pass through during the cutting of the next row without touching the bundle lying upon the ground.

In practice it has been fully demonstrated that my improved attachment effectively performs its duty and a further and decided advantage of my improved attachment resides in the fact that the member 3 of the attachment fastens solidly to the member 1 and comprises no moving parts.

From the foregoing description it is thought to be obvious that an attachment for a corn harvester constructed in accordance with my invention is particularly well adapted for use by reason of the convenience and facility with which it may be assembled and operated, and it will also be obvious that my invention is susceptible of some change and modification without departing from the principles and spirit thereof and for this reason I do not wish to be understood as limiting myself to the precise arrangement and formation of the several parts herein shown in carrying out my invention in practice except as hereinafter claimed.

I claim:

An attachment for a corn harvester comprising an elongated bar possessing a certain degree of inherent resiliency, one end portion of the bar having means for connecting the same to a corn harvester rearwardly of the bundle delivery mechanism and at the grainward side thereof, said bar at said end portion for connection with the harvester having an upstanding straight portion continued by an upwardly curved portion terminating in a downwardly and outwardly inclined elongated arm, said arm being of a length, when the attachment is applied, to terminate beyond the stubbleward side of the harvester in close proximity to the ground surface, said elongated arm providing a track along which the butt end portion of a bundle will slide to cause the bundle to be laid upon the ground in a position substantially parallel with the corn row.

ALEXANDER J. MACIEJKO.